US012764381B2

(12) United States Patent
Koizuka et al.

(10) Patent No.: US 12,764,381 B2
(45) Date of Patent: Oct. 13, 2026

(54) CONTENT DISTRIBUTION SYSTEM, CONTENT DISTRIBUTION METHOD, AND CONTENT DISTRIBUTION PROGRAM

(71) Applicant: DWANGO Co., Ltd., Tokyo (JP)

(72) Inventors: Akihiko Koizuka, Tokyo (JP); Takashi Kojima, Tokyo (JP); Yuri Odagiri, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 0 days.

(21) Appl. No.: 18/998,302

(22) PCT Filed: Jul. 11, 2023

(86) PCT No.: PCT/JP2023/025621
§ 371 (c)(1),
(2) Date: Jan. 24, 2025

(87) PCT Pub. No.: WO2024/024500
PCT Pub. Date: Feb. 1, 2024

(65) Prior Publication Data
US 2026/0046478 A1 Feb. 12, 2026

(30) Foreign Application Priority Data
Jul. 29, 2022 (JP) ................................ 2022-122059

(51) Int. Cl.
*H04N 21/442* (2011.01)
*H04N 21/431* (2011.01)

(52) U.S. Cl.
CPC ... *H04N 21/44218* (2013.01); *H04N 21/4316* (2013.01)

(58) Field of Classification Search
CPC .................... H04N 21/44218; H04N 21/4316
See application file for complete search history.

(56) References Cited

U.S. PATENT DOCUMENTS

2015/0264299 A1* 9/2015 Leech ................. H04N 7/0117 348/78
2019/0069041 A1* 2/2019 Fujita ..................... G06T 13/00

FOREIGN PATENT DOCUMENTS

JP 2016126773 A 7/2016
JP 2020120304 A 8/2020
(Continued)

OTHER PUBLICATIONS

International Search Report and Written Opinion (English Translation for ISR only) for International Patent Application No. PCT/JP2023/025621 dated Feb. 1, 2024, pp. all.
(Continued)

*Primary Examiner* — Kunal Langhnoja
(74) *Attorney, Agent, or Firm* — Dorsey & Whitney LLP

(57) ABSTRACT

A content distribution system according to one embodiment includes at least one processor. The at least one processor is configured to display content on a plurality of user terminals, acquire line-of-sight data indicating line-of-sight positions of users visually recognizing the content from two or more of the plurality of user terminals, analyze two or more pieces of the acquired line-of-sight data to calculate a distribution of line-of-sight positions of two or more users in the content, and determine, based on the calculated distribution, a mode of applying an effect to be applied to the content displayed on at least one target terminal of the plurality of user terminals.

14 Claims, 7 Drawing Sheets

(56) References Cited

FOREIGN PATENT DOCUMENTS

| | | | |
|---|---|---|---|
| JP | 2020202575 | A | 12/2020 |
| JP | 2021190966 | A | 12/2021 |
| WO | 2016014871 | A1 | 1/2016 |
| WO | 2024024500 | A1 | 2/2024 |

OTHER PUBLICATIONS

Notice of Reasons for Refusal for Japanese Patent Application No. 2022-176404 dated on Jul. 7, 2026, pp. all.

* cited by examiner

CONTENT DISTRIBUTION SYSTEM, CONTENT DISTRIBUTION METHOD, AND CONTENT DISTRIBUTION PROGRAM

CROSS REFERENCE TO RELATED APPLICATION(S)

This application is a U.S. National Stage filing under 35 U.S.C. § 371 of PCT Application No. PCT/JP2023/025621, filed Jul. 11, 2023, which claims priority to Japanese Application No. 2022-122059, filed Jul. 29, 2022, which are incorporated herein by reference, in their entirety, for any purpose.

TECHNICAL FIELD

One aspect of the present disclosure relates to a content distribution system, a content distribution method, and a content distribution program.

BACKGROUND ART

A technology for distributing content using information about a line of sight of the viewer is known. For example, a video distribution system described in Patent Document 1 transmits videos based on material data for generating the videos, acquires event information about lines of sight of viewers of the videos while the videos are being played, and performs operations on the material data in accordance with the event information. Patent Documents 2 and 3 also describe technologies for distributing content using information about lines of sight of viewers.

CITATION LIST

Patent Documents

Patent Document 1: Japanese Patent Application Laid-Open No. 2020-120304

Patent Document 2: Japanese Patent Application Laid-Open No. 2016-126773

Patent Document 3: Japanese Patent Application Laid-Open No. 2020-202575

SUMMARY OF INVENTION

Technical Problem

There is a need for a mechanism that can increase the appeal of content to viewers.

Solution to Problem

A content distribution system according to one aspect of the present disclosure includes at least one processor. The at least one processor is configured to display content on a plurality of user terminals, acquire line-of-sight data indicating line-of-sight positions of users visually recognizing the content from two or more of the plurality of user terminals, analyze two or more pieces of the acquired line-of-sight data to calculate a distribution of line-of-sight positions of two or more users in the content, and determine, based on the calculated distribution, a mode of applying an effect to be applied to the content displayed on at least one target terminal of the plurality of user terminals.

In such an aspect, two or more pieces of line-of-sight data are analyzed to obtain a distribution of line-of-sight positions of two or more users in the content, and a mode of applying an effect to be applied to the content is determined based on this distribution. This mechanism allows the mode of applying an effect to be determined based on reactions of a plurality of viewers to the content, thereby increasing the appeal of the content to viewers.

Advantageous Effects of Invention

According to one aspect of the present disclosure, it is possible to increase the appeal of content to viewers.

DESCRIPTION OF EMBODIMENTS

Figure 1:
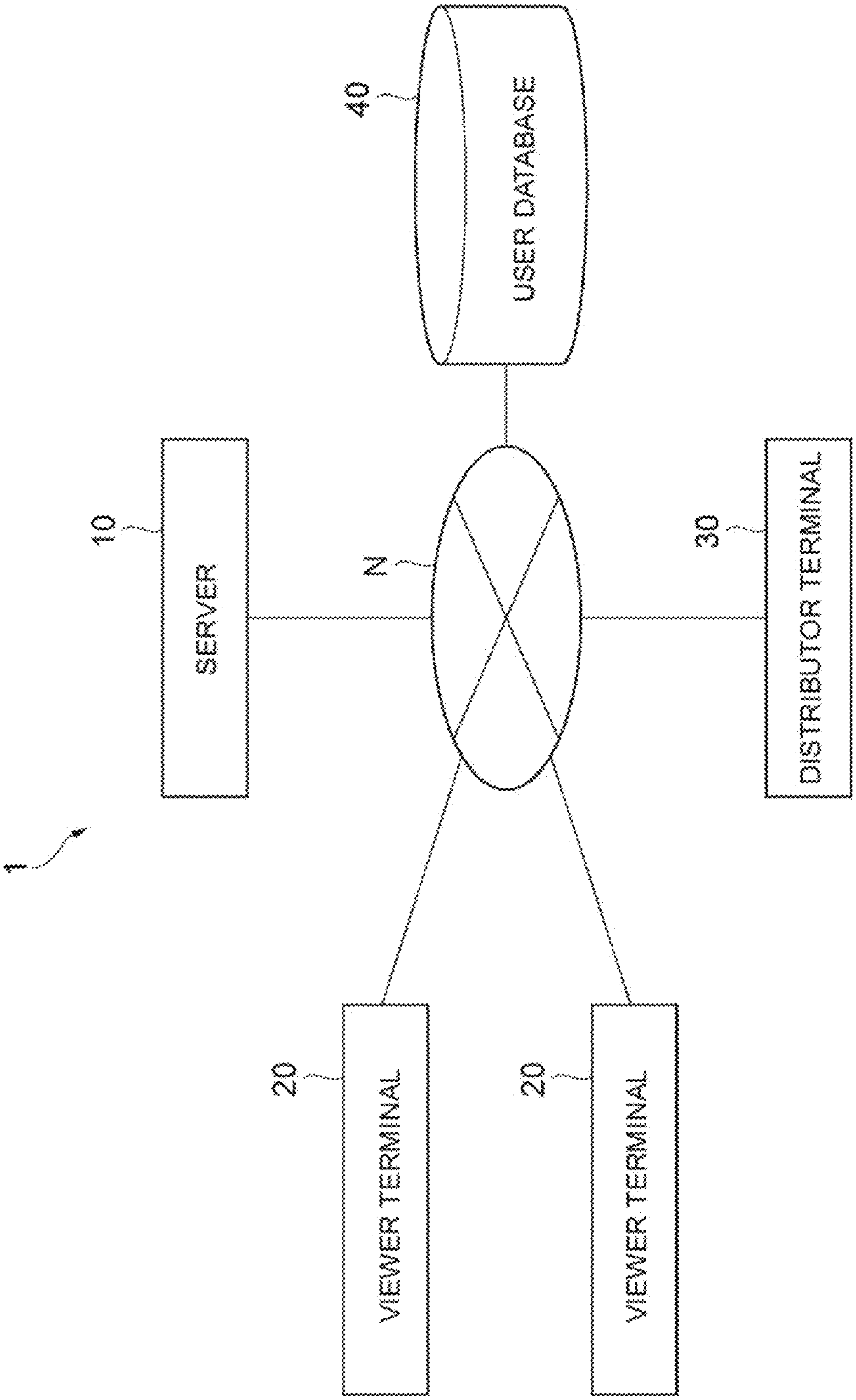
FIG. 1 is a diagram illustrating an example of an application of a content distribution system according to an embodiment.

Hereinafter, embodiments of the present disclosure will be described in detail with reference to the accompanying drawings. In the description of the drawings, the same or equivalent elements are given the same reference numerals, and duplicate descriptions are omitted.

System Overview

A content distribution system according to the embodiment is a computer system that distributes content to users. Content refers to human-perceivable information provided by a computer or computer system. Electronic data representing content is called content data. The expression format of the content is not limited, and the content may be expressed by an image (for example, a photograph, a video, and the like). The content can be used for various types of information transmission or communication, and can be used in various scenes or purposes, such as news, education, medical care, games, chat, business transactions, lectures, seminars, training, concerts, and surveys. Content distribution refers to a process executed to provide content to a user, for example, a process of transmitting information to a user via a communication network.

A content distribution system provides content to a user by transmitting content data to a user terminal. In one example, the content is provided by a distributor. A distributor is a person who intends to provide information to viewers through a content distribution system, and is a sender of the content. A viewer is a person who intends to obtain information through a content distribution system and is a user of the content. The content distribution system transmits content data provided from a distributor terminal to a viewer terminal. The viewer terminal processes the content data and displays the content on a screen. In the present disclosure, distributors and viewers may be collectively referred to as users, and distributor terminals and viewer terminals may be collectively referred to as user terminals.

The content distribution method is not limited. For example, the content distribution system may perform real-time distribution. In this case, for example, the distributor terminal processes a captured video to generate content data, and transmits the content data to the content distribution system in real time. The content distribution system transmits the received content data to the viewer terminal in real time. This is one aspect of live internet broadcasting. The content data may be generated in a content distribution system. That is, the content distribution system may generate content data by processing a real-time video provided from a distributor terminal, and transmit the content data to a viewer terminal in real time. The content distribution system may be used for time-shifting, where content can be viewed at a given period of time after real-time distribution.

The content distribution system may perform on-demand distribution, which allows a viewer to view content at any timing. In this case, for example, the content distribution system may store content data generated by processing previously captured video in a storage device such as a database. The content distribution system may transmit the stored content data to a viewer terminal in response to a viewer request.

The content distribution system acquires, from two or more user terminals, line-of-sight data indicating line-of-sight positions of users visually recognizing content. The line-of-sight position of the user is the position at which the user is looking on the screen of the user terminal. Line-of-sight data is acquired by an eye tracking system. The eye tracking system may be installed in the user terminal, or may be installed in a computer different from the user terminal. Alternatively, the tracking system may be realized by cooperation between the user terminal and another computer.

The content distribution system calculates the distribution of line-of-sight positions of two or more users in the content. The distribution of line-of-sight positions is information indicating where the lines of sight of individual users are located in the content, and indicates, for example, the degree of concentration of the lines of sight of the users. This distribution can indicate the degree to which each area of the content is attracting attention from viewers. The distribution system analyzes two or more pieces of line-of-sight data and calculates a distribution of line-of-sight positions of two or more users. The number of pieces of line-of-sight data used to calculate the distribution of line-of-sight positions may be two or more, and 100 or more or 1000 or more pieces of line-of-sight data may be used. The content distribution system can specify a first area in the content where the line of sight of the user is focused and a second area where the line of sight of the user is less focused than the first area, based on the distribution of line-of-sight positions. The first area can be said to be an area that includes a relatively large number of users' lines of sight (line-of-sight positions), or an area that is viewed by many users. The second area can be said to be an area in which the line of sight of the user (line-of-sight position) is less than that in the first area, or an area that is less likely to be viewed by the user.

The content distribution system determines a mode of applying an effect to be applied to the content based on the distribution of line-of-sight positions. An effect is an audio-visual effect that occurs at the user terminal. For example, the effects include audiovisual effects for guiding the line of sight of the user to a specific area of the content displayed on the user terminal, or audiovisual effects according to the degree of concentration of the line of sight of the user. The mode of applying an effect is information necessary for generating an effect on a user terminal, and includes, for example, the configuration of the effect, the display position of the effect in the content, the volume of the effect, the output timing of the effect, or the like. The configuration of the effect includes the visual configuration (display configuration) and the auditory configuration (sound configuration) of the effect. The electronic data that indicates the mode of applying an effect is called effect data. The user terminal to which the effect is applied is called a target terminal. That is, the content distribution system determines the mode of applying an effect to be applied to the content displayed on the target terminal.

System Configuration

FIG. 1 is a diagram illustrating an example of an application of a content distribution system 1 according to an embodiment. In the present embodiment, the content distribution system 1 includes a server 10. The server 10 is a computer that distributes content data. The server 10 is connected to a plurality of viewer terminals 20 and a distributor terminal 30 via a communication network N. The number of viewer terminals 20 is not limited as long as it is two or more. The number of distributor terminals 30 is not limited as long as it is one or more. The server 10 is also connected to a user database 40 via the communication network N. The configuration of the communication network N is not limited. For example, the communication network N may include the Internet, or may include an intranet.

The viewer terminal 20 is a computer used by a viewer. In one example, the viewer terminal 20 has a function of accessing the content distribution system 1 to receive and display content data. The type and configuration of the viewer terminal 20 are not limited. For example, the viewer terminal 20 may be a mobile terminal such as a high-function mobile phone (smartphone), a tablet terminal, a wearable terminal (for example, a head-mounted display (HMD), smart glasses, and the like), a laptop personal computer, or a mobile phone. Alternatively, the viewer terminal 20 may be a stationary terminal such as a desktop personal computer.

The distributor terminal 30 is a computer used by a distributor. In one example, the distributor terminal 30 has a function of capturing a video and a function of accessing the content distribution system 1 and transmitting electronic data (video data) showing the video. The type and configuration of the distributor terminal 30 are not limited. For example, the distributor terminal 30 may be an imaging system having the functions of capturing, recording, and transmitting a video. Alternatively, the distributor terminal 30 may be a mobile terminal such as a high-function mobile phone (smartphone), a tablet terminal, a wearable terminal (for example, a head-mounted display (HMD), smart glasses, and the like), a laptop personal computer, or a mobile phone. Alternatively, the distributor terminal 30 may be a stationary terminal such as a desktop personal computer.

A viewer operates the viewer terminal 20 to log in to the content distribution system 1, thereby enabling the viewer to view the content. A distributor operates the distributor terminal 30 to log in to the content distribution system 1, and can thereby provide content to viewers. In the present embodiment, it is assumed that the viewer and the distributor of the content distribution system 1 have already logged in. It is not essential for a viewer to log in to the content distribution system 1. That is, the content distribution system 1 can transmit content data to the viewer terminal 20 of a general viewer who has not logged in. In this case, general viewers who have not logged in can also view the content.

The user database 40 is a non-transitory storage device that stores data used by the content distribution system 1. The user database 40 stores attribute information of users (for example, viewers) who use the content distribution system 1. The attribute information is various types of information about the user, and may include, for example, the user's identifier (user ID), age, gender, identifiers of the content viewed by the user (content ID), and the number of times the content has been viewed. The attribute information may include information randomly selected or set by the user. For example, the attribute information may include information about a favorite person or character selected by the user, an image color associated with the person or character, and the like. The attribute information may be stored in an area other than the user database 40. For example, the attribute information may be stored in a cookie area of a browser in the viewer terminal 20. The attribute information may include information indicating whether or not the user is logged in to the content distribution system 1.

The user database 40 may be constructed as a single database, or may be a set of a plurality of databases. The location where the user database 40 is installed is not limited. For example, the user database 40 may be provided in a computer system separate from the content distribution system 1.

Figure 2:
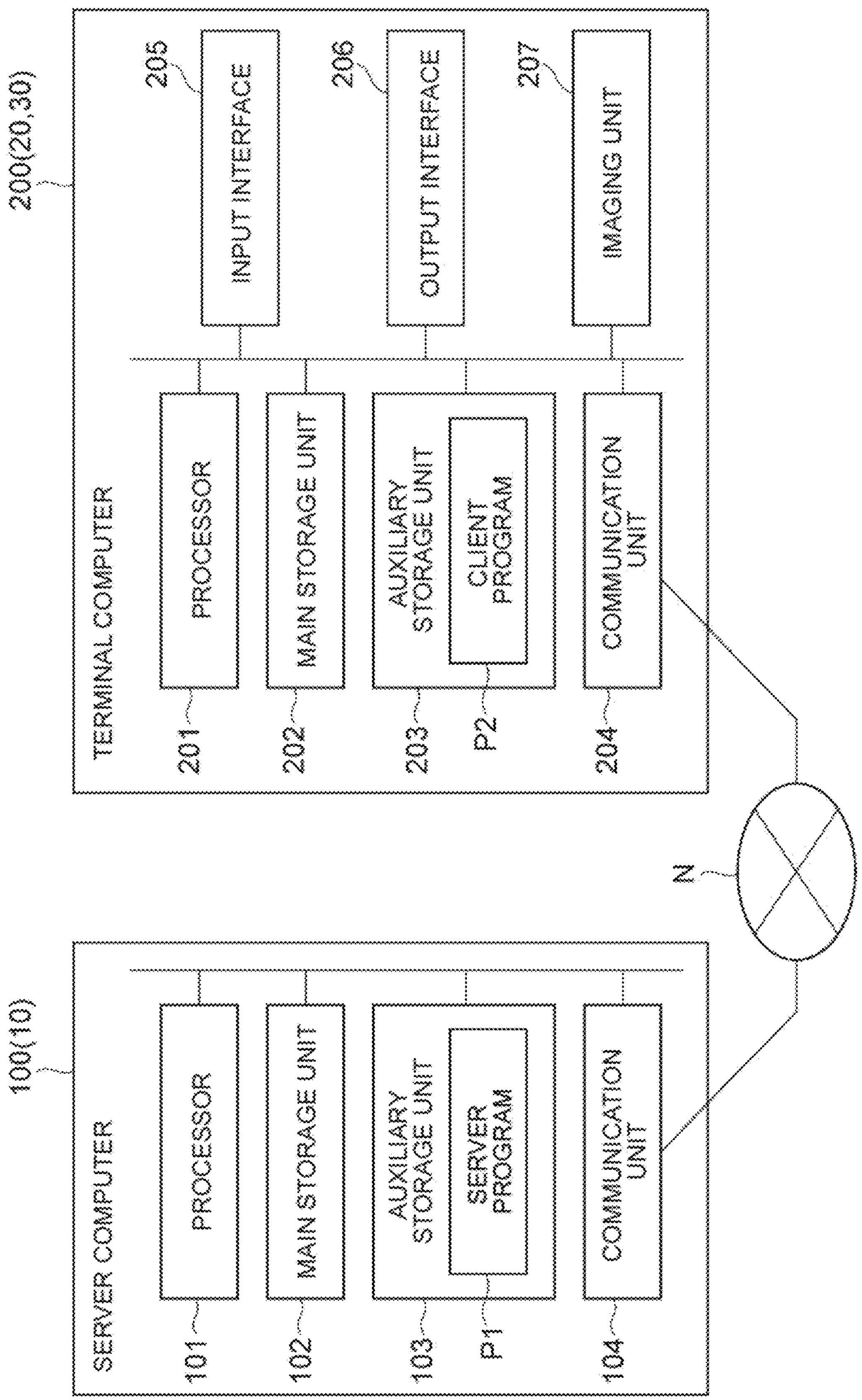
FIG. 2 is a diagram illustrating an example of a hardware configuration related to the content distribution system according to the embodiment.

FIG. 2 is a diagram illustrating an example of a hardware configuration related to the content distribution system 1. FIG. 2 illustrates a server computer 100 functioning as the server 10, and a terminal computer 200 functioning as the viewer terminal 20 or the distributor terminal 30.

As an example, the server computer 100 includes, as hardware components, a processor 101, a main storage unit 102, an auxiliary storage unit 103, and a communication unit 104. The processor 101 is a computing device that executes an operating system and application programs, and is, for example, a central processing unit (CPU) or a graphics processing unit (GPU). The main storage unit 102 is a device that stores programs to be executed, computation results, and the like, and includes, for example, a read-only memory (ROM) or a random-access memory (RAM). The auxiliary storage unit 103 is generally a device capable of storing a larger amount of data than the main storage unit 102, and includes, for example, a non-volatile storage medium such as a hard disk or a flash memory. The auxiliary storage unit 103 stores a server program P1 for causing the server computer 100 to function as the server 10, and various types of data. The communication unit 104 is a device that executes data communication with other computers via the communication network N, and includes, for example, a network card or a wireless communication module.

In the present embodiment, a content distribution program is implemented as the server program P1. Each functional element of the server 10 is realized by loading the server program P1 onto the processor 101 or the main storage unit 102 and causing the processor 101 to execute the program. The server program P1 includes code for realizing each functional element of the server 10. The processor 101 operates the communication unit 104 in accordance with the server program P1, and executes reading and writing of data in the main storage unit 102 or the auxiliary storage unit 103.

The server 10 may be include one or more computers. In a case where a plurality of computers are used, these computers are connected to each other via a communication network N to logically configure one server 10.

As an example, the terminal computer 200 includes, as hardware components, a processor 201, a main storage unit 202, an auxiliary storage unit 203, a communication unit 204, an input interface 205, an output interface 206, and an imaging unit 207. The processor 201 is a computing device that executes an operating system and application programs, and is, for example, a CPU or a GPU. The main storage unit 202 is a device that stores programs to be executed, computation results, and the like, and includes, for example, a ROM or a RAM. The auxiliary storage unit 203 is generally a device capable of storing a larger amount of data than the main storage unit 202, and includes, for example, a non-volatile storage medium such as a hard disk or a flash memory. The auxiliary storage unit 203 stores a client program P2 for causing the terminal computer 200 to function as the viewer terminal 20 or the distributor terminal 30, and various types of data. The communication unit 204 is a device that executes data communication with other computers via the communication network N, and includes, for example, a network card or a wireless communication module. The input interface 205 is a device that receives data based on a user's operation or action, and includes at least one of a keyboard, operation buttons, a pointing device, a touch panel, a microphone, a sensor, and a camera, for example. The output interface 206 is a device that outputs data processed by the terminal computer 200, and includes a display device such as a monitor, a touch panel, or an HMD. The imaging unit 207 is a device that captures an image (video or photograph) of the real world, such as a camera. The imaging unit 207 can also function as the input interface 205.

Each functional element of the viewer terminal 20 or the distributor terminal 30 is realized by loading a corresponding client program P2 into the processor 201 or the main storage unit 202 and causing the processor 201 to execute the program. The client program P2 includes code for realizing each functional element of the viewer terminal 20 or the distributor terminal 30. The processor 201 operates the communication unit 204, the input interface 205, the output interface 206, or the imaging unit 207 in accordance with the client program P2, and reads and writes data from and to the main storage unit 202 or the auxiliary storage unit 203.

At least one of the server program P1 and the client program P2 may be provided in a state in which it is non-temporarily recorded on a tangible recording medium such as a CD-ROM, a DVD-ROM, or a semiconductor memory. Alternatively, at least one of these programs may be provided via the communication network N as a data signal superimposed on a carrier wave. These programs may be provided separately or together.

Figure 3:
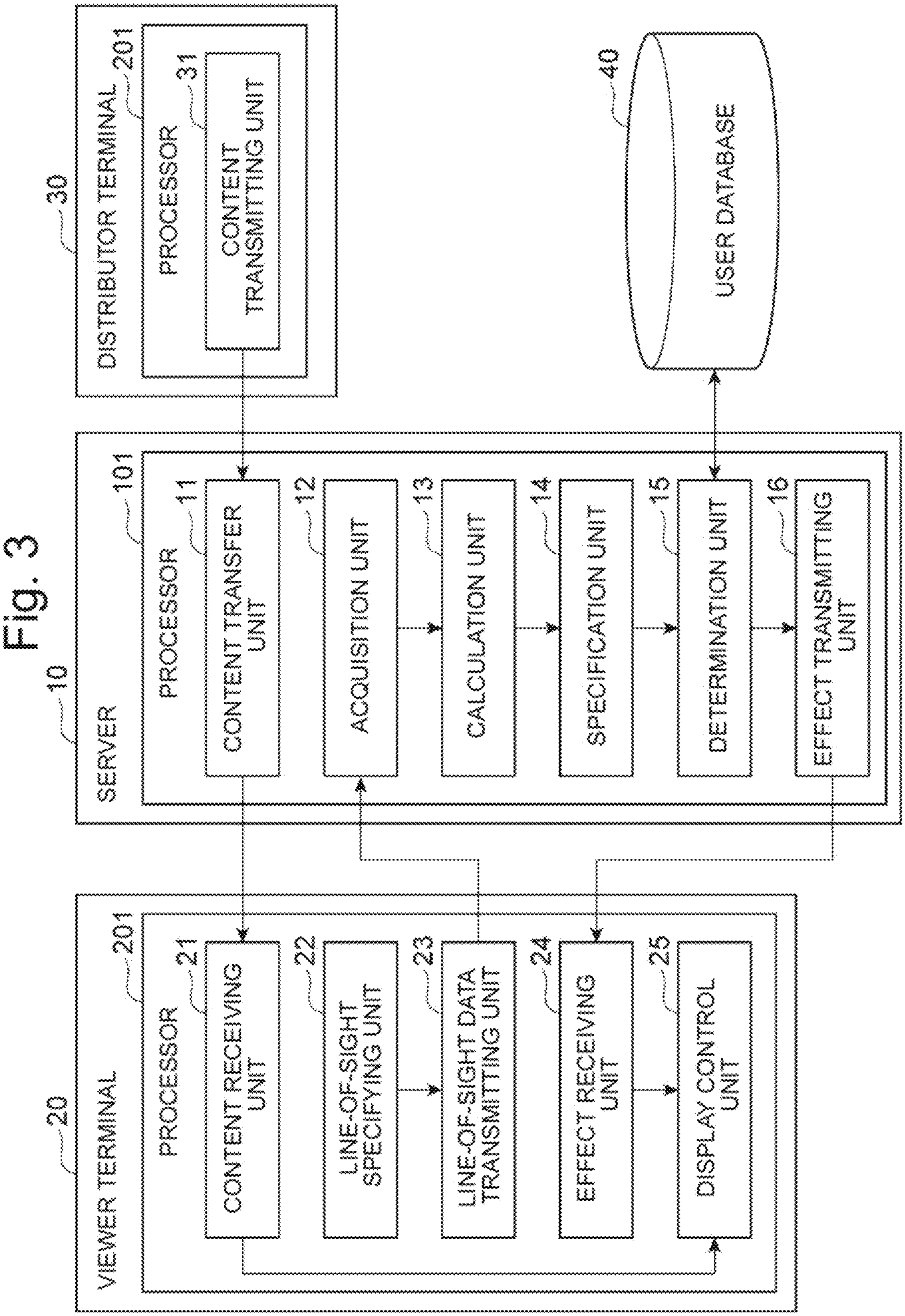
FIG. 3 is a diagram illustrating an example of a functional configuration related to the content distribution system according to the embodiment.

FIG. 3 is a diagram illustrating an example of a functional configuration related to the content distribution system 1. The server 10 includes, as functional elements, a content transfer unit 11, an acquisition unit 12, a calculation unit 13, a specification unit 14, a determination unit 15, and an effect transmitting unit 16. The content transfer unit 11 is a functional element that receives content data transmitted from the distributor terminal 30 and transmits the content data to the viewer terminal 20. The acquisition unit 12 is a functional element that acquires line-of-sight data from the viewer terminal 20. The calculation unit 13 is a functional element that analyzes the line-of-sight data acquired by the acquisition unit 12 and calculates the distribution of line-of-sight positions. The specification unit 14 is a functional element that specifies a first area in the content where the line of sight of the user is focused and a second area where the line of sight of the user is less focused than in the first area, based on the distribution of line-of-sight positions calculated by the calculation unit 13. The determination unit 15 is a functional element that determines a mode of applying the effect based on the distribution of line-of-sight positions. The effect transmitting unit 16 is a functional element that transmits effect data to the viewer terminal 20.

The viewer terminal 20 includes, as functional elements, a content receiving unit 21, a line-of-sight specifying unit 22, a line-of-sight data transmitting unit 23, an effect receiving unit 24, and a display control unit 25. The content receiving unit 21 is a functional element that receives content data from the server 10. The line-of-sight specifying unit 22 is a functional element that specifies the line-of-sight position based on the movement of the viewer's eyes. In the present embodiment, the line-of-sight specifying unit 22 constitutes an eye tracking system. The line-of-sight data transmitting unit 23 is a functional element that transmits line-of-sight data indicating the line-of-sight position to the server 10. The effect receiving unit 24 is a functional element that receives effect data from the server 10. The display control unit 25 is a functional element that controls the display on the screen of the viewer terminal 20.

The distributor terminal 30 includes a content transmitting unit 31 as a functional element. The content transmitting unit 31 is a functional element that transmits content data to the server 10.

[System Operation]

Figure 4:
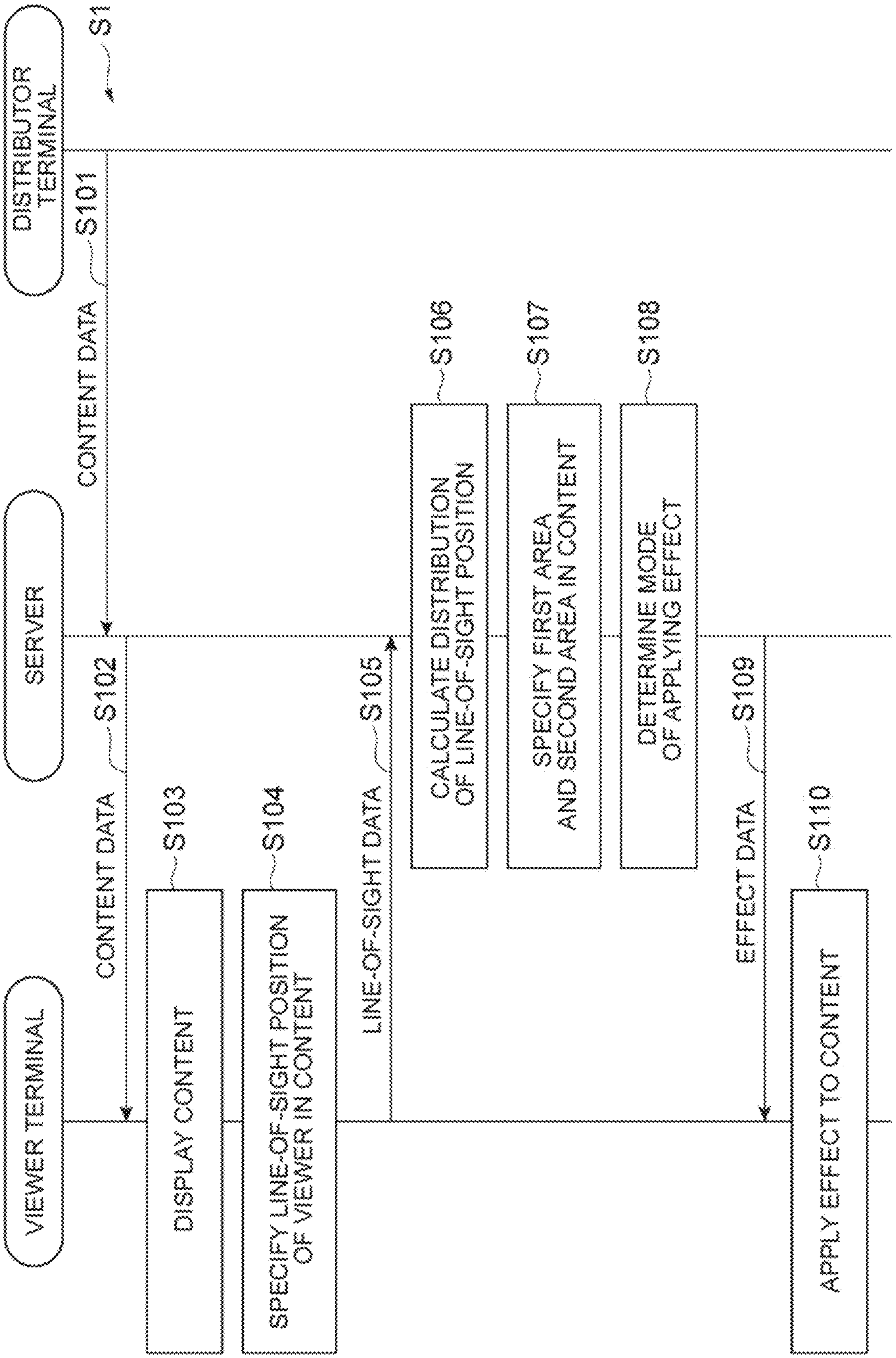
FIG. 4 is a sequence diagram illustrating an example of a content distribution process.

An operation of the content distribution system 1 will be described with reference to FIG. 4, and a content distribution method according to the present embodiment will be described. FIG. 4 is a sequence diagram illustrating an example of a content distribution process as process flow S1.

In step S101, the content transmitting unit 31 transmits the content data to the server 10. For example, when a distributor operates the distributor terminal 30 to distribute content to viewers, the content transmitting unit 31 transmits content data to the server 10 in response to the operation. The content transfer unit 11 receives the content data transmitted from the content transmitting unit 31.

In step S102, the content transfer unit 11 transmits the content data to the plurality of viewer terminals 20. The content transfer unit 11 transmits content data in response to a content request from the viewer terminal 20. The content request is a data signal for requesting the server 10 to play the content. For example, when a viewer operates the viewer terminal 20 to start playing desired content, the viewer terminal 20 generates a content request in response to the operation and transmits it to the server 10. The content transfer unit 11 transmits the content data in response to the content request. The content receiving unit 21 receives the content data transmitted from the content transfer unit 11.

In step S103, the viewer terminal 20 displays the content. When the content receiving unit 21 receives the content data, the display control unit 25 processes the content data and displays the content on the screen. The viewer terminal 20 may output a voice from a speaker in accordance with the display of the content.

In step S104, the line-of-sight specifying unit 22 specifies the line-of-sight position of the viewer. The line-of-sight specifying unit 22 specifies the line-of-sight position on the screen of the viewer terminal 20 based on the movement of the viewer's eyes. The method of specifying the line-of-sight position by the line-of-sight specifying unit 22 is not limited. As an example, the line-of-sight specifying unit 22 may capture an image of the area around the viewer's eyes using the imaging unit 207 of the viewer terminal 20, and specify the line-of-sight position based on the position of the iris with the inner corner of the user's eye as the reference point. As another example, the line-of-sight specifying unit 22 may specify the line-of-sight position of the viewer using a corneal reflex method (PCCR). In a case where the corneal reflex method is employed, the viewer terminal 20 may be provided with an infrared emitting device and an infrared camera as hardware configuration. The line-of-sight position may be expressed, for example, using a two-dimensional coordinate system that can uniquely specify a position on the screen of the viewer terminal 20.

In step S105, the line-of-sight data transmitting unit 23 transmits the line-of-sight data indicating the line-of-sight position to the server 10. The line-of-sight data indicating the line-of-sight position is not limited to data indicating the coordinate position of the line of sight on the screen. For example, the viewer terminal 20 may acquire data indicating that the viewer is visually recognizing a specific area in the content (for example, a specific object included in the content) as line-of-sight data, and the line-of-sight data transmitting unit 23 may transmit the acquired line-of-sight data to the server 10. The acquisition unit 12 receives (acquires) the line-of-sight data transmitted by the line-of-sight data transmitting unit 23. The acquisition unit 12 acquires line-of-sight data from two or more of the plurality of viewer terminals 20. That is, the acquisition unit 12 acquires two or more pieces of line-of-sight data.

In step S106, the calculation unit 13 calculates the distribution of the line-of-sight positions of two or more viewers in the content. The calculation unit 13 analyzes two or more pieces of line-of-sight data acquired by the acquisition unit 12 and calculates the distribution of line-of-sight positions. The method of calculating the distribution of line-of-sight positions by the calculation unit 13 is not limited. For example, the calculation unit 13 may divide the content into a plurality of small areas, and calculate the number of lines of sight located within each small area as the distribution of line-of-sight positions based on the acquired line-of-sight data.

In step S107, the specification unit 14 specifies a first area in the content where the line of sight of the viewer is focused and a second area where the line of sight of the viewer is less focused than the first area. The specification unit 14 specifies a first area and a second area based on the distribution of line-of-sight positions calculated by the calculation unit 13.

The method by which the specification unit 14 specifies the first area and the second area is not limited. For example, the specification unit 14 divides the content into a plurality of small areas. The specification unit 14 may specify a small area as a first area in a case where the number of lines of sight located within the small area is equal to or greater than a predetermined first threshold. The specification unit 14 may specify a small area as a second area in a case where the number of lines of sight located within the small area is equal to or less than a predetermined second threshold that is smaller than the first threshold. In a case where a plurality of consecutive small areas are all first areas, the specification unit 14 may specify these plurality of small areas collectively as one first area. Similarly, in a case where a plurality of consecutive small areas are all second areas, the specification unit 14 may specify these plurality of small areas collectively as one second area. The shapes and sizes of the first area and second area are not limited. The first area and second area may be polygonal, circular, or irregularly shaped with no symmetry.

In step S108, the determination unit 15 determines a mode of applying an effect to be applied to the content based on the distribution of line-of-sight positions. The determination unit 15 determines, as a mode of applying the effect, for example, the configuration of the effect, the display position of the effect in the content, the volume of the effect, the output timing of the effect, or the like.

In a case where the effect is a visual effect, the effect may be configured to change the display mode of a part of the content, for example. As an example, the change in the display mode may be to add a pattern (for example, a star, heart, or face mark) or a character string to a part of the content, or to surround a part of the content with a border. The change in the display mode may be to display one part of the content brighter or darker than another part. The change in the display mode may be to display the content in a form in which a part of the content is enlarged or reduced. The change in the display mode may be to display the content in a form in which a predetermined movement (for example, vibration, rotation, or the like) is performed on a part of the content.

The effect may be configured to change the display mode of comments included in the content. The comments may be comments posted by a plurality of viewers via the viewer terminals 20. In this case, the content distribution system 1 includes a comment posted from a certain viewer terminal 20 in the content and causes the comment to be displayed on the other viewer terminals 20 as well. Therefore, a viewer can view not only the comments he or she has posted, but also the comments provided by other viewers. The change in the display mode of a comment may be to add a pattern to the target comment, to change the color of the target comment to a specific color, or to change the font of the target comment to a specific font. The change in the display mode of the comment may be to display the target comment larger than other comments. Changing the display mode of a comment is included in changing the display mode of a part of the content described above.

In a case where the effect is an auditory effect, the effect may be configured to generate a sound that is related to the content. As an example, the effect may be configured to generate the voice of a person or character included in the content, to generate a sound related to an object included in the content (such as an engine sound in a case where the content includes a car), or to generate a voice reading out a comment included in the content.

As described above, the determination unit 15 determines the mode of applying an effect based on the distribution of line-of-sight positions. The determination unit 15 may determine the mode of applying the effect by using information indicating the first area and the second area specified based on the distribution of line-of-sight positions. As an example, the determination unit 15 may determine, as a mode of applying the effect, that the display mode of the first area is changed. In this case, the effect may be configured to add a pattern or a character string to the first area, to display the comment located in the first area larger than the other comments, or the like. The effect may be configured to display information indicating the number or percentage of viewers visually recognizing the first area. The information indicating the number or percentage of viewers is not limited to a specific numerical value. For example, an icon or the like included in the first area may be displayed to make a predetermined movement (for example, vibration, rotation, or the like) that indicates that the number or percentage of viewers visually recognizing the first area is large. The number or percentage of viewers visually recognizing the first area is calculated based on the distribution of line-of-sight positions.

As another example, the determination unit 15 may determine, as a mode of applying the effect, that a sound related to the first area is generated. In this case, the effect may be configured to generate a voice of a person or character located in the first area, to generate a sound related to an object located in the first area, to generate a voice reading out a comment located in the first area, or the like.

By applying the above-mentioned effects to the first area, the line of sight is further focused to the first area where the line of sight is already focused. That is, the above-described effect can be said to be an audiovisual effect for guiding the line of sight of the viewer to the first area in the content. The above-mentioned effect is an effect related to the first area where the line of sight of the viewer is focused, and can be said to be an audiovisual effect according to the degree of concentration of the line of sight of the viewer.

The determination unit 15 may determine, as a mode of applying the effect, that the display mode of the second area is changed. The configuration of the effect in this case is the same as when the display mode of the first area is changed. That is, for example, the effect may be configured to add a pattern or a character string to the second area, to display the comment located in the second area larger than the other comments, or the like. The effect may be configured to display information indicating the number or percentage of viewers visually recognizing the second area.

The determination unit 15 may determine, as a mode of applying the effect, that a sound related to the second area is generated. The configuration of the effect in this case is the same as when a sound related to the first area is generated. That is, for example, the effect may be configured to generate a voice of a person or character located in the second area, to generate a sound related to an object located in the second area, to generate a voice reading out a comment located in the second area, or the like.

By applying the above-mentioned effects to the second area, the line of sight is focused to the second area where the line of sight is not focused. That is, the above-described effect can be said to be an audiovisual effect for guiding the line of sight of the viewer to the second area in the content. The above-mentioned effect is an effect related to the second area where the line of sight of the viewer is not focused, and can be said to be an audiovisual effect according to the degree of concentration of the line of sight of the viewer.

In step S109, the effect transmitting unit 16 transmits effect data indicating the mode of applying the effect to the viewer terminal 20. At this time, the effect transmitting unit 16 may not transmit the effect data to all viewer terminals 20, but may transmit the effect data only to the viewer terminals 20 (target terminals) to which the effect is to be applied. The effect receiving unit 24 of the viewer terminal 20 to which the effect data has been transmitted receives the effect data.

In step S110, the viewer terminal 20 applies an effect to the content. In a case where the effect is a visual effect, the display control unit 25 processes the effect data and displays the effect on the screen. In a case where the effect is an auditory effect, the viewer terminal 20 outputs the effect from a speaker.

Figure 5:
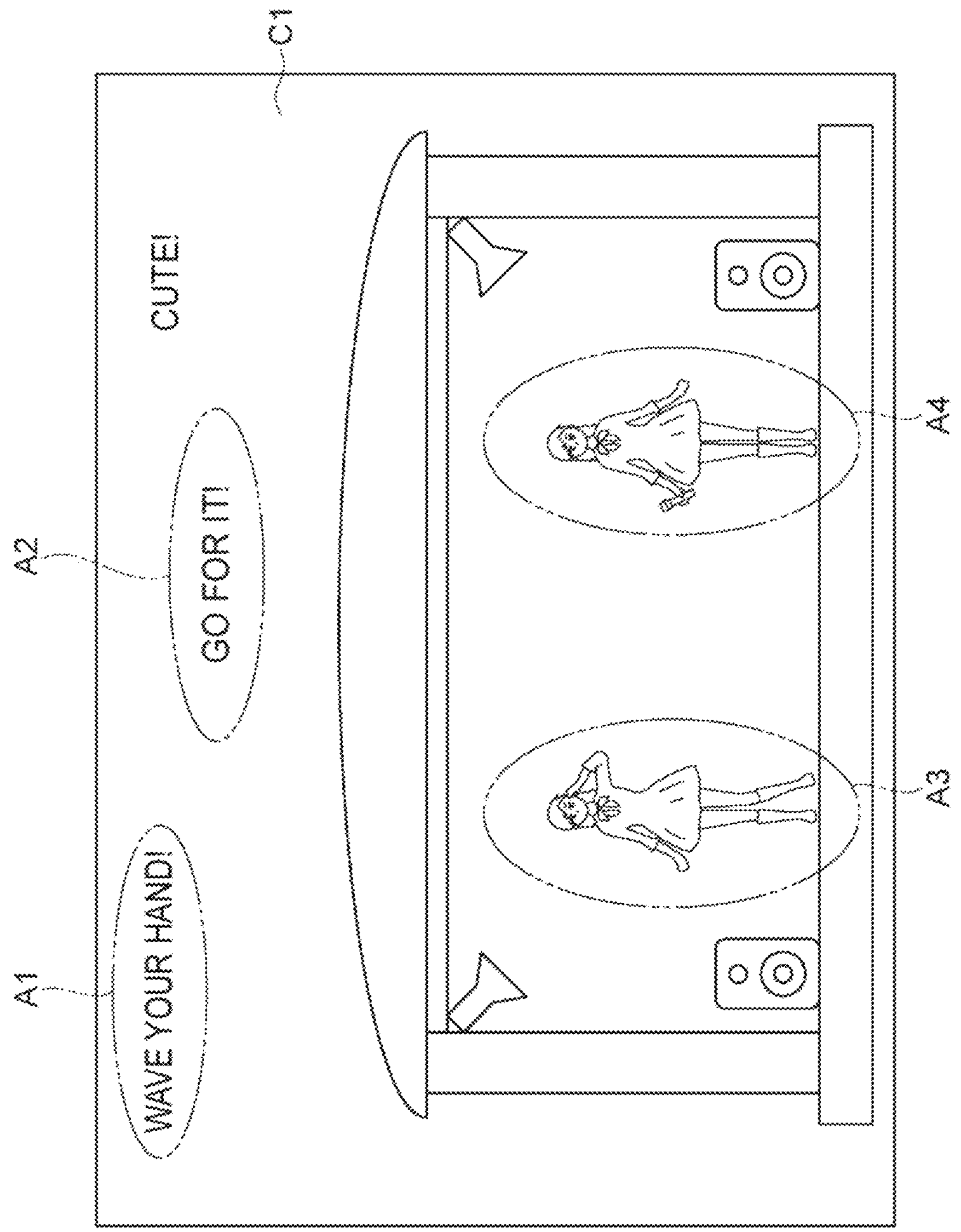
FIG. 5 is a diagram illustrating an example of content before an effect is applied.
Figure 6:
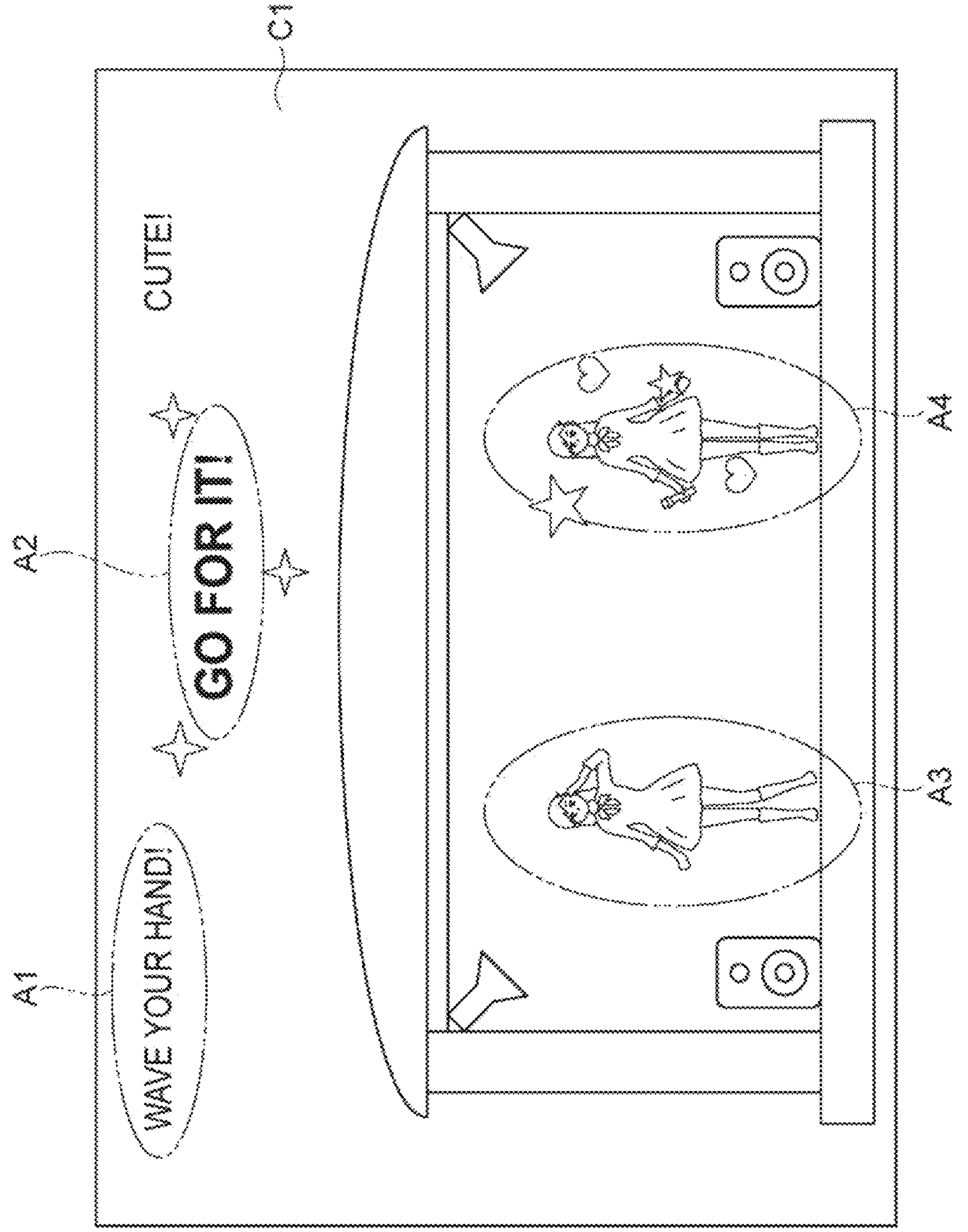
FIG. 6 is a diagram illustrating an example of content to which an effect is applied.

An example of a mode of applying an effect will be described with reference to FIGS. 5 and 6. FIG. 5 is a diagram illustrating an example of content before an effect is applied. FIG. 6 is a diagram illustrating an example of content to which an effect is applied.

In the examples of FIGS. 5 and 6, the viewer terminal 20 displays a video of two singers performing a live concert as content C1. The content C1 includes comments posted by a plurality of viewers. In this example, the comments "Wave your hand!", "Go for it!", and "Cute!" are displayed.

First, the specification unit 14 specifies a first area in the content C1 where the line of sight of the viewer is focused and a second area where the line of sight of the viewer is less focused than the first area, based on the distribution line-of-sight positions. In this example, the specification unit 14 specifies an area A1 in which the comment "Wave your hand!" is displayed and an area A3 in which one singer is displayed as the first area, and specifies an area A2 in which the comment "Go for it!" is displayed and an area A4 in which the other singer is displayed as the second area.

Thereafter, the determination unit 15 determines a mode of applying the effect based on the distribution of line-of-sight positions. In this example, the determination unit 15 determines, as a mode of applying the effect, that the comment included in the area A2 specified as the second area is displayed to be larger than the other comments to add a star mark to the comment, and that a star and heart mark are added to the area A4 specified as the second area. Furthermore, the determination unit 15 determines, as a mode of applying the effect, that the voice (for example, a voice such as "Look at me!") of the singer located in the area A4 specified as the second area is generated. The effect transmitting unit 16 transmits effect data indicating the mode of applying the effect determined by the determination unit 15 to the viewer terminal 20 (target terminal).

The effect receiving unit 24 receives the effect data, and the viewer terminal 20 processes the effect data to generate an effect. In this example, the display control unit 25 displays the comment included in the area A2 larger than the other comments, and adds marks such as stars to the area A2 and the area A4. The viewer terminal 20 generates the voice of the singer located in the area A4 from a speaker.

Figure 7:
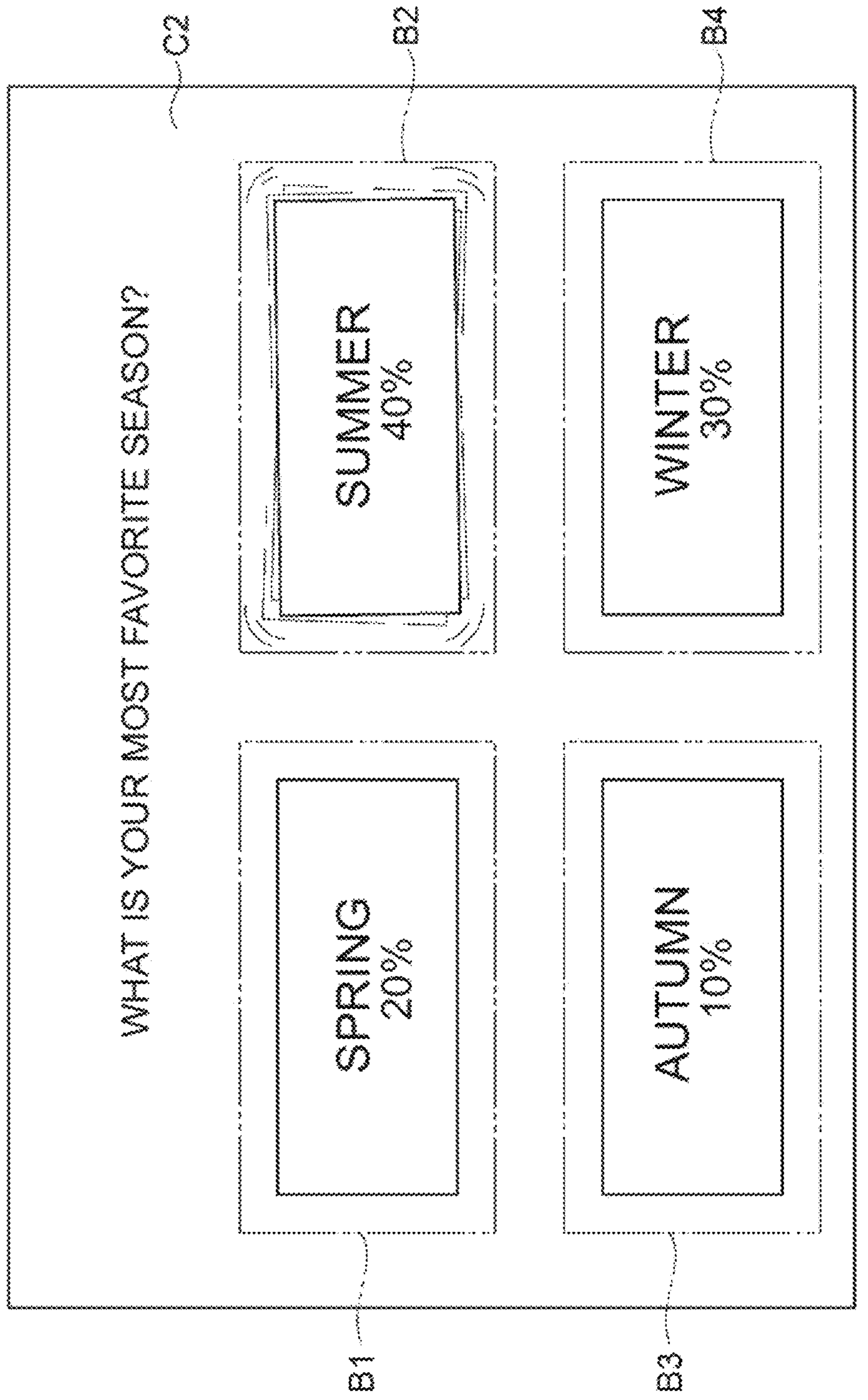
FIG. 7 is a diagram illustrating another example of content to which an effect is applied.

Another example of the mode of applying an effect will be described with reference to FIG. 7. FIG. 7 is a diagram illustrating another example of content to which an effect is applied. In the example of FIG. 7, the viewer terminal 20 displays, as content C2, a survey video including a character string constituting the question "What is your most favorite season?" and four icons constituting the options "Spring", "Summer", "Autumn", and "Winter", respectively.

First, the specification unit 14 specifies a first area in the content C2 where the line of sight of the viewer is focused and a second area where the line of sight of the viewer is less focused than the first area, based on the distribution line-of-sight positions. In this example, the specification unit 14 specifies an area B2 including the "Summer" icon as the first area, and specifies areas B1, B3, and B4 including the "Spring", "Autumn", and "Winter" icons, respectively, as the second area.

Thereafter, the determination unit 15 determines a mode of applying the effect based on the distribution of line-of-sight positions. In this example, the determination unit 15 determines, as a mode of applying the effect, that the "Summer" icon included in the area B2 specified as the first area is displayed in a vibrating manner, and that the percentage of the line of sight located in each of the areas B1 to B4 is displayed on the corresponding icon. That is, in this example, an icon that is particularly attracting the attention of the viewer (the icon on which the line of sight of the viewer is focused) is displayed in a vibrating manner. In addition, in this example, the degree of attention from viewers to each icon (percentage of lines of sight) is displayed as a numerical value. The percentage of lines of sight is calculated from the distribution of line-of-sight positions. In this example, the character string "20%", indicating the percentage of lines of sight located in the area B1, is displayed on the "Spring" icon, the character string "40%", indicating the percentage of lines of sight located in the area B2, is displayed on the "Summer" icon, the character string "10%", indicating the percentage of lines of sight located in the area B3, is displayed on the "Autumn" icon, and the character string "30%", indicating the percentage of lines of sight located in the area B4, is displayed on the "Winter" icon. The effect transmitting unit 16 transmits effect data indicating the mode of applying the effect determined by the determination unit 15 to the viewer terminal 20 (target terminal).

The effect receiving unit 24 receives the effect data, and the viewer terminal 20 processes the effect data to generate an effect. In this example, the display control unit 25 displays the "Summer" icon included in the area B2 in a vibrating manner, and displays a character string indicating the percentage of lines of sight on the corresponding icon.

MODIFICATION EXAMPLES

Various examples of the present disclosure have been described above in detail. However, the present disclosure is not limited to the above examples. Various modifications are possible to the present disclosure without departing from the gist of the present disclosure.

The content distribution system 1 may transmit content data not only to the viewer terminal 20 but also to the distributor terminal 30. The distributor terminal 30 processes the content data and displays the content on a screen. In this case, the content distribution system 1 may also transmit effect data to the distributor terminal 30. The distributor terminal 30 processes the effect data and applies the effect to the content. That is, the distributor terminal 30 can also function as a viewer terminal 20 (target terminal).

The mode of applying the effect is not limited to the above-mentioned examples. The determination unit 15 may determine the mode of applying the effect based on attribute information of the viewer. The determination unit 15 may determine the mode of applying the effect based on attribute information such as age or gender, for example. Specifically, the determination unit 15 may determine, as a mode of applying the effect, that comments included in a first area, where the lines of sight of elderly viewers are focused, are displayed to be larger and in a more noticeable color than other comments. In this manner, in a case where the determination unit 15 determines a mode of applying the effect based on attribute information of the viewer, the calculation unit 13 may classify the viewers into a plurality of groups based on the attribute information and calculate the distribution of line-of-sight positions for each group. For example, the calculation unit 13 may calculate the distribution of line-of-sight positions for each age group or gender of the viewers.

When calculating the distribution of line-of-sight positions, the calculation unit 13 may weight the line-of-sight data based on attribute information of the viewer. For example, the calculation unit 13 may calculate the distribution of line-of-sight positions by using a numerical value obtained by multiplying the number of lines of sight of viewers of a specific age group or gender by a predetermined coefficient.

The determination unit 15 may determine the mode of applying the effect based on attribute information of a viewer who uses a target terminal (hereinafter referred to as a target person). Specifically, in a case where the attribute information includes information on a favorite person or character selected by the target person and an image color associated with the person or character, the determination unit 15 may set the voice generated as an effect to the voice of the person or character selected by the target person, or may set the color of a pattern added to the content as an effect to the image color associated with the person or character.

In a case where a plurality of comments posted by viewers are included in and displayed as content, the determination unit 15 may determine, as a mode of applying the effect, that only a predetermined number of comments in which a large number of lines of sight are focused among the plurality of comments are displayed, and the other comments are not displayed. At this time, the determination unit 15 specifies comments in which a large number of lines of sight are focused based on the distribution of line-of-sight positions.

The determination unit 15 may determine, as a mode of applying the effect, that the distribution of line-of-sight positions is displayed on the screen of the user terminal in a format that is visually recognizable to the user, such as a heat map. In this case, the determination unit 15 may determine a mode of applying the effect, without the specification unit 14 specifying the first area and the second area.

In a case where the content distribution system 1 is used for on-demand distribution, the acquisition unit 12 acquires line-of-sight data every time content is viewed by each viewer, and accumulates the acquired line-of-sight data in a database. The calculation unit 13 may analyze two or more pieces of the accumulated line-of-sight data to calculate the distribution of line-of-sight positions. That is, the timing at which the acquisition unit 12 acquires the line-of-sight data from each viewer terminal 20 does not necessarily have to be simultaneous, and may be different.

In a case where the content distribution system 1 is used for on-demand distribution, the content distribution system 1 may accumulate data indicating the history of comments posted by a certain viewer in a database, and when other viewers view the content, the comments may be included in the content and displayed based on the data.

In a case where there is a difference in the timing at which content is displayed on each viewer terminal 20, the viewer terminal 20 may transmit to the server 10, together with the line-of-sight data, data indicating the time at which the line-of-sight data was acquired (for example, data indicating the progress of the content). A case where there is a difference in the timing at which content is displayed on each viewer terminal 20 is, for example, a case where the content distribution system 1 is used for on-demand distribution, a case where there is a delay (lag) in the timing at which content is displayed, or the like. The calculation unit 13 of the server 10 can calculate the distribution of line-of-sight positions for each scene included in the content, based on the line-of-sight data and data indicating the time at which the line-of-sight data was acquired. In a case where there is no difference in the timing at which content is displayed on each viewer terminal 20, the viewer terminal 20 may not transmit, to the server 10, data indicating the time at which the line-of-sight data was acquired. A case where there is no difference in the timing at which content is displayed on each viewer terminal 20 is, for example, a case where the content distribution system 1 is used for real-time distribution, or a case where there is no delay (lag) in the timing at which content is displayed.

The process of applying an effect may be performed by the server 10. For example, the server 10 may change the configuration of the content based on the mode of applying an effect determined by the determination unit 15 (such as changing the content to one in which a part is highlighted), and transmit content data indicating the changed content to the viewer terminal 20. In this case, the display control unit 25 of the viewer terminal 20 processes the content data and displays the content, and thereby the content to which the effect has been applied is displayed on the screen.

In the present disclosure, the expression "at least one processor executes a first process, executes a second process, . . . executes an n-th process" or a corresponding expression shows a concept including cases where the executing entity (that is, the processor) of the n processes from the first process to the n-th process changes along the way. That is, this expression shows a concept that includes both the case where all of the n processes are executed by the same processor and the case where the processor is changed among the n processes according to any policy The processing procedures of the method executed by the at least one processor are not limited to the examples in the above embodiments. For example, part of the steps described above may be omitted, or each step may be executed in a different order. In addition, any two or more of the steps described above may be combined, or some of the steps may be modified or deleted. Alternatively, other steps may be executed in addition to the steps described above.

In comparing the magnitude relationship of two numerical values, either of the two criteria "equal to or greater than" or "greater than" may be used, or either of the two criteria "equal to or less than" or "less than" may be used.

Any part or all of the functional units described in the present specification may be realized by a program. The program mentioned in the present specification may be distributed by being non-temporarily recorded on a computer-readable recording medium, or may be distributed via a communication line (including wireless communication) such as the Internet, or may be distributed in an installed state on any terminal.

Based on the above description, those skilled in the art may conceive additional effects or various modification examples of the present disclosure, but the aspects of the present disclosure are not limited to the specific embodiments described above. Various additions, modifications, and partial deletions are possible without departing from the conceptual idea and gist of the present disclosure derived from the contents defined in the claims and their equivalents.

For example, a configuration described in the present specification as a single device (or member; the same applies below) (including a configuration depicted in the drawings as a single device) may be realized by a plurality of devices. Alternatively, a configuration described in the present specification as a plurality of devices (including a configuration depicted in the drawings as a plurality of devices) may be realized by a single device. Alternatively, some or all of the means or functions included in a certain device (for example, a server) may be included in another device (for example, a user terminal).

Not all of the matters described in the present specification are essential requirements. For example, matters described in the present specification but not described in the claims may be considered optional additional matters.

The applicant is only aware of the known technologies described in the "Citation List" section of the present specification. It should also be noted that the present disclosure is not necessarily intended to solve any problems in the known technologies. The problem to be solved in the present disclosure should be recognized in light of the entire present specification. For example, in a case where it is stated in the present specification that a predetermined effect is achieved by a specific configuration, it can also be said that the problem corresponding to the predetermined effect is solved. However, the description of the effects does not necessarily imply that such a specific configuration is an essential requirement.

ADDENDA

As can be ascertained from the various examples above, the present disclosure includes the following aspects.

Addendum 1

A content distribution system including at least one processor, wherein the at least one processor is configured to:

display content on a plurality of user terminals;

acquire line-of-sight data indicating line-of-sight positions of users visually recognizing the content from two or more of the plurality of user terminals;

analyze two or more pieces of the acquired line-of-sight data to calculate a distribution of line-of-sight positions of two or more users in the content; and determine, based on the calculated distribution, a mode of applying an effect to be applied to the content displayed on at least one target terminal of the plurality of user terminals.

Addendum 2

The content distribution system described in Addendum 1, wherein the at least one processor is configured to:

specify, based on the distribution, a first area in the content where lines of sight of the two or more users are focused and a second area where the lines of sight of the two or more users are less focused than the first area; and determine, as the mode of applying the effect, that a display mode of the first area of the content displayed on the at least one target terminal is changed.

Addendum 3

The content distribution system described in Addendum 1, wherein the at least one processor is configured to:

specify, based on the distribution, a first area in the content where lines of sight of the two or more users are focused and a second area where the lines of sight of the two or more users are less focused than the first area; and determine, as the mode of applying the effect, that a display mode of the second area of the content displayed on the at least one target terminal is changed.

Addendum 4

The content distribution system described in any one of Addenda 1 to 3, wherein the plurality of user terminals include a distributor terminal that distributes the content and a plurality of viewer terminals, and the content is content that is distributed in real time from the distributor terminal to the plurality of viewer terminals.

Addendum 5

The content distribution system described in any one of Addenda 1 to 3, wherein the plurality of user terminals include a plurality of viewer terminals, and the content is content that is distributed on demand to the plurality of viewer terminals.

Addendum 6

The content distribution system described in any one of Addenda 1 to 5, wherein the at least one processor is configured to determine the mode of applying the effect based on attribute information of the plurality of users.

Addendum 7

A content distribution method executed by a content distribution system including at least one processor, the content distribution method including:

a step of displaying content on a plurality of user terminals;

a step of acquiring line-of-sight data indicating line-of-sight positions of users visually recognizing the content from two or more of the plurality of user terminals;

a step of analyzing two or more pieces of the acquired line-of-sight data to calculate a distribution of line-of-sight positions of two or more users in the content; and a step of determining, based on the calculated distribution, a mode of applying an effect to be applied to the content displayed on at least one target terminal of the plurality of user terminals.

Addendum 8

A content distribution program causing a computer to execute:

a step of displaying content on a plurality of user terminals;

a step of acquiring line-of-sight data indicating line-of-sight positions of users visually recognizing the content from two or more of the plurality of user terminals;

a step of analyzing two or more pieces of the acquired line-of-sight data to calculate a distribution of line-of-sight positions of two or more users in the content; and a step of determining, based on the calculated distribution, a mode of applying an effect to be applied to the content displayed on at least one target terminal of the plurality of user terminals.

According to Addenda 1, 7, and 8, two or more pieces of line-of-sight data are analyzed to obtain a distribution of line-of-sight positions of two or more users in the content, and a mode of applying an effect to be applied to the content is determined based on this distribution. This mechanism allows the mode of applying an effect to be determined based on reactions of a plurality of viewers to the content, thereby increasing the appeal of the content to viewers. In one example, this mechanism allows reactions of viewers to be reflected in the content, providing interactive content and thus promoting communication between viewers and distributors, and among viewers themselves.

According to Addendum 2, the display mode of the first area where the line of sight of the user is focused is changed. This makes it possible, for example, to apply an effect for guiding the line of sight of the viewer to the first area, thereby further focusing the line of sight to the first area.

According to Addendum 3, the display mode of the second area where the line of sight of the user is less focused than the first area is changed. This makes it possible, for example, to apply an effect for guiding the line of sight of the viewer to the second area, thereby dispersing the line of sight that is omnipresent in the first area and focusing the line of sight to the second area.

According to Addendum 4, effects are applied to content that is distributed in real time. Accordingly, it is possible to increase the appeal of content that is distributed in real time to viewers.

According to Addendum 5, effects are applied to content that is distributed on demand. Accordingly, it is possible to increase the appeal of content that is distributed on demand to viewers.

According to Addendum 6, the mode of applying an effect is determined based on the attribute information of the viewers, thereby further increasing the appeal of the content to viewers.

REFERENCE CHARACTERS

1: content distribution system
10: server
11: content transfer unit
12: acquisition unit
13: calculation unit
14: specification unit
15: determination unit
16: effect transmitting unit
20: viewer terminal
21: content receiving unit
22: line-of-sight specifying unit
23: line-of-sight data transmitting unit
24: effect receiving unit
25: display control unit
30: distributor terminal
31: content transmitting unit
40: user database
A1, A2, A3, A4, B1, B1, B2, B3, B4: area
C1, C2: content
P1: server program
P2: client program

The invention claimed is:

1. A content distribution system, comprising at least one processor configured to:

display content on a plurality of user terminals;

acquire line-of-sight data indicating line-of-sight positions of users visually recognizing the content from two or more of the plurality of user terminals, the two or more of the plurality of user terminals including two or more viewer terminals, each of the line-of-sight positions being a position at which a corresponding one of the users is looking on a screen of a corresponding one of the two or more viewer terminals, the line-of-sight data being acquired based on tracking of eye movements of the respective users at the two or more viewer terminals;

analyze two or more pieces of the acquired line-of-sight data to calculate a distribution of line-of-sight positions of two or more users in the content, the distribution of line-of-sight positions indicating where lines of sight of the two or more users are located in the content; and determine, based on the calculated distribution, a mode of applying an effect to be applied to the content displayed on at least one target terminal of the plurality of user terminals, the mode of applying the effect including effect data transmitted to the at least one target terminal for causing the at least one target terminal to generate a visual effect and/or an audio effect.

2. The content distribution system according to claim 1, wherein the at least one processor is configured to:

specify, based on the distribution, a first area in the content where lines of sight of the two or more users are focused and a second area where the lines of sight of the two or more users are less focused than the first area; and determine, as the mode of applying the effect, that a display mode of the first area of the content displayed on the at least one target terminal is changed.

3. The content distribution system according to claim 1, wherein the at least one processor is configured to:

specify, based on the distribution, a first area in the content where lines of sight of the two or more users are focused and a second area where the lines of sight of the two or more users are less focused than the first area; and determine, as the mode of applying the effect, that a display mode of the second area of the content displayed on the at least one target terminal is changed.

4. The content distribution system according to claim 1, wherein the plurality of user terminals include a distributor terminal that distributes the content and a plurality of viewer terminals, and the content is content that is distributed in real time from the distributor terminal to the plurality of viewer terminals.

5. The content distribution system according to claim 1, wherein the plurality of user terminals include a plurality of viewer terminals, and the content is content that is distributed on demand to the plurality of viewer terminals.

6. The content distribution system according to claim 1, wherein the at least one processor is configured to determine the mode of applying the effect based on attribute information of the plurality of users.

7. The content distribution system according to claim 1, wherein the distribution of line-of-sight positions includes a degree of concentration of the line-of-sight positions of the two or more users in the content.

8. The content distribution system according to claim 7, wherein the degree of concentration indicates an area in which lines of sight of a larger number of users are located than in another area of the content.

9. The content distribution system according to claim 1, wherein the at least one processor is configured to calculate the distribution of line-of-sight positions by dividing the content into a plurality of areas and calculating a number or percentage of lines of sight of the two or more users for each of the plurality of areas.

10. The content distribution system according to claim 9, wherein the mode of applying the effect includes effect data for causing the at least one target terminal to generate the visual effect and/or the audio effect according to the number or percentage calculated for each of the plurality of areas.

11. The content distribution system according to claim 1, wherein the effect includes displaying information indicating a number or percentage of viewers visually recognizing an area in the content.

12. The content distribution system according to claim 1, wherein the at least one processor is configured to calculate the distribution of line-of-sight positions for each group of users classified based on attribute information.

13. A content distribution method executed by a content distribution system including at least one processor, the content distribution method comprising:

displaying content on a plurality of user terminals;

acquiring line-of-sight data indicating line-of-sight positions of users visually recognizing the content from two or more of the plurality of user terminals, the two or more of the plurality of user terminals including two or more viewer terminals, each of the line-of-sight positions being a position at which a corresponding one of the users is looking on a screen of a corresponding one of the two or more viewer terminals, the line-of-sight data being acquired based on tracking of eye movements of the respective users at the two or more viewer terminals;

analyzing two or more pieces of the acquired line-of-sight data to calculate a distribution of line-of-sight positions of two or more users in the content, the distribution of line-of-sight positions indicating where lines of sight of the two or more users are located in the content; and determining, based on the calculated distribution, a mode of applying an effect to be applied to the content displayed on at least one target terminal of the plurality of user terminals, the mode of applying the effect including effect data transmitted to the at least one target terminal for causing the at least one target terminal to generate a visual effect and/or an audio effect.

14. A non-transitory computer-readable medium storing thereon a content distribution program that, when executed, causes a computer to execute:

displaying content on a plurality of user terminals;

acquiring line-of-sight data indicating line-of-sight positions of users visually recognizing the content from two or more of the plurality of user terminals, the two or more of the plurality of user terminals including two or more viewer terminals, each of the line-of-sight positions being a position at which a corresponding one of the users is looking on a screen of a corresponding one of the two or more viewer terminals, the line-of-sight data being acquired based on tracking of eye movements of the respective users at the two or more viewer terminals;

analyzing two or more pieces of the acquired line-of-sight data to calculate a distribution of line-of-sight positions of two or more users in the content, the distribution of line-of-sight positions indicating where lines of sight of the two or more users are located in the content; and determining, based on the calculated distribution, a mode of applying an effect to be applied to the content displayed on at least one target terminal of the plurality of user terminals, the mode of applying the effect including effect data transmitted to the at least one target terminal for causing the at least one target terminal to generate a visual effect and/or an audio effect.

* * * * *